US005625721A

United States Patent [19]

Lopresti et al.

[11] Patent Number: 5,625,721
[45] Date of Patent: Apr. 29, 1997

[54] CERTIFIABLE OPTICAL CHARACTER RECOGNITION

[75] Inventors: Daniel P. Lopresti, Hopewell, N.J.; Henry F. Korth, Ambler, Pa.; Jonathan S. Sandberg, New York, N.Y.; Richard J. Lipton, Cranbury, N.J.

[73] Assignee: Matsushita Information Technology Laboratory, Princeton, N.J.

[21] Appl. No.: 223,830

[22] Filed: Apr. 6, 1994

Related U.S. Application Data

[63] Continuation of Ser. No. 958,938, Oct. 9, 1992, abandoned.

[51] Int. Cl.$^6$ ............................................. G06K 9/03
[52] U.S. Cl. ........................ 382/309; 358/405; 382/176
[58] Field of Search ...................... 382/57, 61, 9, 382/8, 176, 180, 309, 310, 311; 358/403, 405; 364/737; 371/53, 52, 57.2

[56] References Cited

U.S. PATENT DOCUMENTS

| Re. 29,104 | 1/1977 | Shepard | 382/61 |
|---|---|---|---|
| 3,200,372 | 8/1965 | Hamburgen | 340/146.1 |
| 3,713,097 | 1/1973 | Linnerooth et al. | 382/57 |
| 3,763,467 | 10/1973 | Cash et al. | 382/61 |
| 4,105,997 | 8/1978 | McGinn | 382/57 |
| 4,503,556 | 3/1985 | Scherl et al. | 382/176 |
| 4,589,144 | 5/1986 | Namba | 382/9 |
| 4,727,429 | 2/1988 | Ueno | 358/405 |
| 4,741,046 | 4/1988 | Matsunawa et al. | 382/176 |
| 4,747,146 | 5/1988 | Nishikawa et al. | 382/8 |
| 4,750,209 | 6/1988 | Shimura et al. | 382/176 |
| 4,754,489 | 6/1988 | Bokser | 382/37 |
| 4,809,341 | 2/1989 | Matsui et al. | 382/8 |
| 4,866,666 | 9/1989 | Fracisco | 371/53 |
| 4,893,188 | 1/1990 | Murakami et al. | 382/176 |
| 4,928,313 | 5/1990 | Leonard et al. | 382/8 |
| 5,001,767 | 3/1991 | Yoneda et al. | 382/176 |

OTHER PUBLICATIONS

Japanese Patent Abstract No. A 63182771 based upon Japanese Patent Publication No. JP63182771 of Hideko.

*Primary Examiner*—Joseph Mancuso
*Attorney, Agent, or Firm*—Amster, Rothstein & Ebenstein

[57] ABSTRACT

A certificate, calculated on the text of a document to be reproduced, is included in the document in a form which is machine-readable. Upon optical character recognition scanning, or other digitizing reproduction, the certificate is also scanned and stored for comparison. A new certificate is calculated on the contents of the reproduced document and compared to the scanned certificate. If the two certificates are different, it is known that at least one error exists in the reproduced document. More than one certificate can be provided for a document in order to facilitate error location on the document and error correction therein.

18 Claims, 3 Drawing Sheets

FIG. 1
PRIOR ART
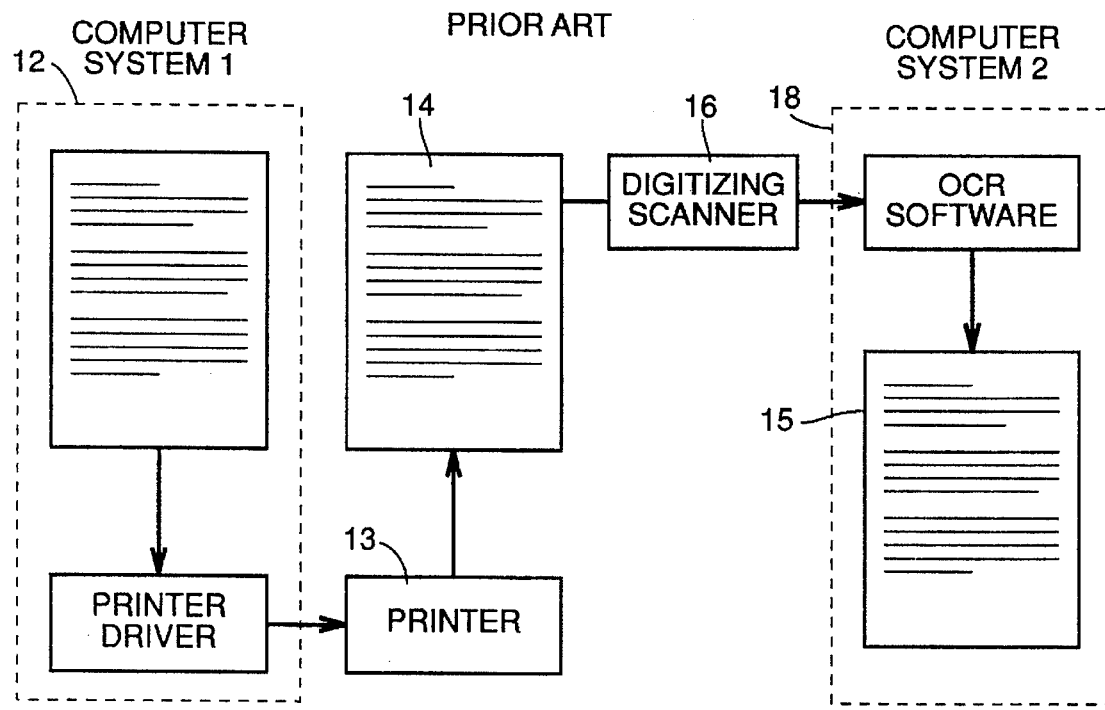
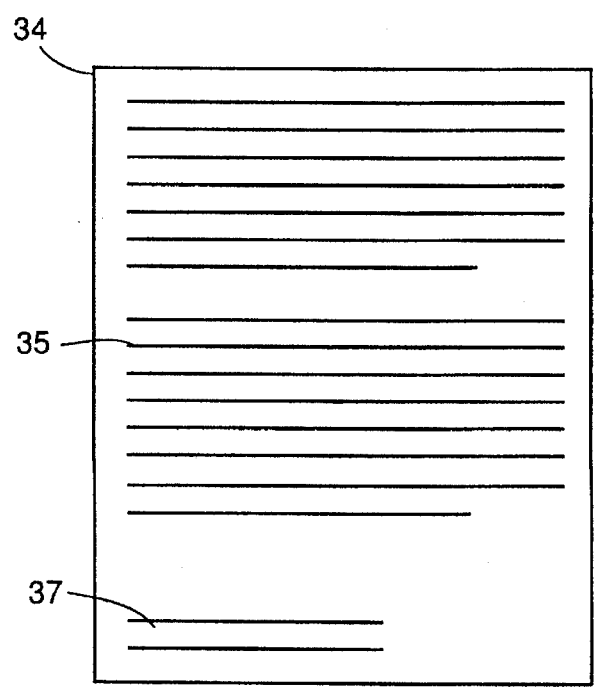
FIG. 3

CERTIFIABLE OPTICAL CHARACTER RECOGNITION

This is a continuation of application Ser. No. 07/958,938 filed on Oct. 9, 1992 now abandoned.

This invention relates to the use of automatically generated document markers More particularly, it relates to the use of markers of encoded information incorporated into each page of a document for providing a means for not only document identification and document structure recognition, but also error detection and error correction when the marked documents are reproduced using optical character recognition technology.

BACKGROUND OF THE INVENTION

The identification of products using computer readable bar codes, wherein digital data is recorded directly on paper, provides for item identification given a fixed set of values using simple numeric encoding and scanning technologies. Identification of computer generated and stored documents is another technology which has been developed using binary encoding to identify and provide for retrieval of stored documents. Most document-generating software programs provide not only identification and/or retrieval information for the document, but also include encoded information for provision to an associated printer specifying, for example, such details as spacing, margins and related layout information. Once the document has been printed on paper, however, that information no longer accompanies the document, other than as discerned by the user. If it is desired to reproduce the document using an optical character recognition (OCR) system, there is no automatic means by which to communicate the layout information through the scanner and to the receiving computer. A desirable extension of the identification technology would be, therefore, the provision of a means for generating a paper version of a document which can be recognized, reproduced and proof-read by a computer by optically scanning a marker incorporated in or on the paper document in conjunction with the OCR text scanning of the document.

Document or product identification systems which have been employed in the past include bar code markers and scanners which have found use in a wide range of arenas. With respect to paper documents, special marks or patterns in the paper have been used to provide information to a related piece of equipment, for example the job control sheet for image processing as taught by Hikawa in U.S. Pat. No. 5,051,779. Similarly, identifying marks have been incorporated into forms as described in U.S. Pat. No. 5,060,980 of Johnson, et al. The Johnson, et al system provides for the editing of forms which are already resident in the computer. A paper copy of the form is edited by the user and then scanned to provide insertions to the fields of the duplicate form that is stored electronically in the computer. Still another recently patented system is described in U.S. Pat. No. 5,091,966 of Bloomberg, et al, which teaches the decoding of glyph shape codes, which codes are digitally encoded data on paper. The identifying codes can be read by the computer and thereby facilitate computer handling of the document, such as identifying, retrieving and transmitting the document. The systems described in the art do not incorporate text error detection or correction schemes. Further, the systems require that the associated computer have a copy of the document of interest in its memory prior to the input of information via the scanning. The systems cannot be applied to documents which are being created in the scanning computer by OCR.

Optical character recognition systems, as illustrated schematically in FIG. 1, generally include a digitizing scanner, 16, and associated "scanning" computer, 18, for scanning a printed page, 14, which was generated by an originating computer, 12, and output by a printer, 13. The scanner, 16, extracts the text to be saved, as electronic document 15, in a standard electronic format, such as ASCII. What is desirable is to additionally incorporate information about the text for error detection and about the layout thereof, which information can be optically scanned or otherwise automatically input.

Due to the inherent limitations in both the scanning process and the ability of an optical character recognition system to effect accurate character recognition, errors are introduced into the output, including not only character misinterpretation errors but also layout-dependent errors. Post-processing, specifically error detection, must then be performed, primarily by human proof-reading of the reproduced document. Errors in layout are ordinarily not automatically rectifiable by the computer; but, rather, require extensive, user-intensive editing or possibly re-creation of the document. The human post-processing is expensive not only in terms of actual costs but also in the time needed to complete the processed document. Optimally, solutions will provide not only a means for detecting errors but also a means for correcting the errors. Further, an ideal solution should facilitate identification of the document and define the appropriate layout structure for the document.

Error detection systems which have been employed in the computer document creation technology (e.g., word processing) include techniques based on dictionary lookup and/or attempts to use semantic, or context, information extracted from the document in order to identify and correct errors. Many of these systems require that entries in the document which do not correlate to an entry in the lexicon will be reviewed by a "human post-processor". The automated error correction version of a dictionary-based system will, upon identification, spontaneously correct entries which do not correlate to dictionary entries. One can readily envision a circumstance wherein automatic correction is not desirable, such as in the case of a proper name, an intentional misspelling or a newly coined term. The presumption in the use of dictionary-comparison versions of such systems is that each entry in the entire document be compared to a data-base dictionary of terms. The cost of comparison of each entry of a document to a given lexicon is quite high. Streamlined error detection and correction, without the need for entry-by-entry comparison, is desirable.

The use of semantic information extracted from the document is further proposed in the art in order to facilitate the identification and automatic correction of errors that have been detected but which cannot be readily identified as misspellings of available dictionary terms or which "resemble" more than one available dictionary entry. Such a system will recognize and correct the term "ofthe" to "of the" when a dictionary lookup would simply reject the term. Similarly, a bank of commonly-occurring errors for the hardware or software being used, and for the font or fonts being scanned, has been proposed for use with the context, or semantic, information in order to identify and automatically correct common errors, such as "rn" being incorrectly identified as "m", or the letter "o" being incorrectly identified as the number "0".

To detect errors without requiring an entry-by-entry lookup, particularly for documents which are transmitted over extended networks, systems have made use of parity bits transmitted with the data. Once the transmission has been effected, a bit count is done on the "new" document. If the calculated bit matches the transmitted parity bit, then an error-free transmission is assumed. Such systems, and extensions of the parity and check bit concept, as taught in U.S. Pat. No. 5,068,854 of Chandran, et al, are useful for detecting errors in digitally encoded information. Further extensions of the parity bit concept, such as balanced weight error correcting codes, to detect and provide correction of more than a one-bit error are also found in the art, such as in U.S. Pat. No. 4,965,883 of Kirby. Parity and check bit systems developed for use with binary coded information are capable of ascertaining the presence of errors with reasonable accuracy given the low probability of the error bit of an erroneously-received quantity of data matching the check bit of the transmitted material. Since the bits are calculated on binary-encoded data, they are most effective for detecting one-bit errors; except as modified in the weighted balancing and random checking instances. Generally speaking, however, the check and parity bit systems tend to be data-independent methods for assuring error-free transmission of computer-to-computer transfers. The check and parity bit systems are not, therefore, considered thorough checking systems but merely first screening techniques which are limited to digital-to-digital communications and not applicable to analog-to-digital conversions such as optical character recognition.

A further prior art system, providing a 16-bit check sequence which is data-dependent and calculated on the contents of the data field, is found in U.S. Pat. No. 4,964,127 of Calvignac, et al. Once again, the system is applied to data which is transmitted along a data path, presumably in digital format.

In the field of optical character recognition (OCR), there is a similar need to provide the means for detecting and correcting errors in data which has been reproduced from optical scanning, bit mapping and computer encoding. Both dictionary lookup and common-error reference have been proposed for use in the OCR context. However, as with the document creation needs of the past, the entry-by-entry checking is both costly and inefficient. Moreover, in addition to the printed words, the document layout is a critical feature in OCR. The use of current parity bit check systems in an optically-scanned, bit-mapped system is only nominally effective for error detection, relatively ineffective for error location and totally ineffective for detection and correction of improper layout.

Apparatus for identifying and correcting "unrecognizable" characters in OCR machines is taught in U.S. Pat. No. 4,974,260 of Rudak. In that system, the characters which are not recognized, in the electronic dictionary lookup operation, are selectively displayed for an operator to effect interpretation and correction. More fully automated OCR error detection and correction is desirable, but not currently available.

It is therefore an objective of the present invention to provide a means and method for automatically incorporating information markers on a paper document, which information is encoded to provide a variety of detail about the document to an associated computer.

It is another objective of the invention to establish the absense or presence of errors on a page reproduced using OCR technology without requiring an entry-by-entry comparison.

It is another objective of the invention to provide an error detection system and method for precisely locating errors on a page reproduced using OCR technology.

It is still another objective of the invention to provide an error detection system which can be used in conjunction with existing error correction systems to screen a document for errors prior to effecting error correction procedures.

Another objective of the invention is to provide an automatic error correction means and method for documents reproduced using OCR technology.

It is yet another objective of the invention to provide an error detection system which can overlook intentional misspellings, abbreviations, etc.

It is a further objective of the invention to provide an error detection system which can be used with any document format, fonts, and related hardware.

It is yet another objective of the invention to provide a means for providing documents with unique markers which can be used to impart various information to computers.

Still another objective of the present invention is to provide a means and method for supplying documents with computer-readable markers which contain information about the document including document structure, error identification, location and correction information, and document identification and retrieval information.

SUMMARY OF THE INVENTION

These and other objectives are realized by a system which implements the creation and incorporation of a document marker for documents to be reproduced. The marker can include a variety of information including document structure and error detection encoding. The error detection encoding information comprises a certificate including at least one value calculated on the text and incorporated, by one of various encoding techniques, to the certificate which is provided on the face of the document to be reproduced. Upon OCR reproduction of the document, the certificate for the text, as the text appears on the reproduction, can be recalculated and then compared to the original certificate. If the values match, the probability is that the reproduction is error-free. If the certificates do not match, at least one error is present in the text as reproduced. The certificate can provide not only error detection, but also error location (for example, which line contains the error); and can, in conjunction with prior art dictionary lookup and semantic systems, be utilized to effect error correction. Additional information can be encoded with the calculated text certificates or as separate information in the markers on the paper documents which will be machine readable to provide information regarding the document layout, document identification, document location in the computer system, destinations of computers or other interconnected peripherals for transmission of the document and such other information as may be required.

BRIEF DESCRIPTION OF THE DRAWINGS

The invention will now be described in greater detail with reference to the accompanying drawings wherein:

FIG. 1 schematically illustrates the prior art OCR method of scanning and reproducing a document.

FIG. 3 illustrates a document generated in accordance with the present invention.

DETAILED DESCRIPTION OF THE PREFERRED EMBODIMENT

In accordance with the present invention, markers are created for paper documents which may contain data-dependent error detection information, hereinafter referred to as "certificates", and document layout information for communication to a "scanning" computer and use by the scanning computer upon reproduction of the document using OCR technology.

Figure 2:
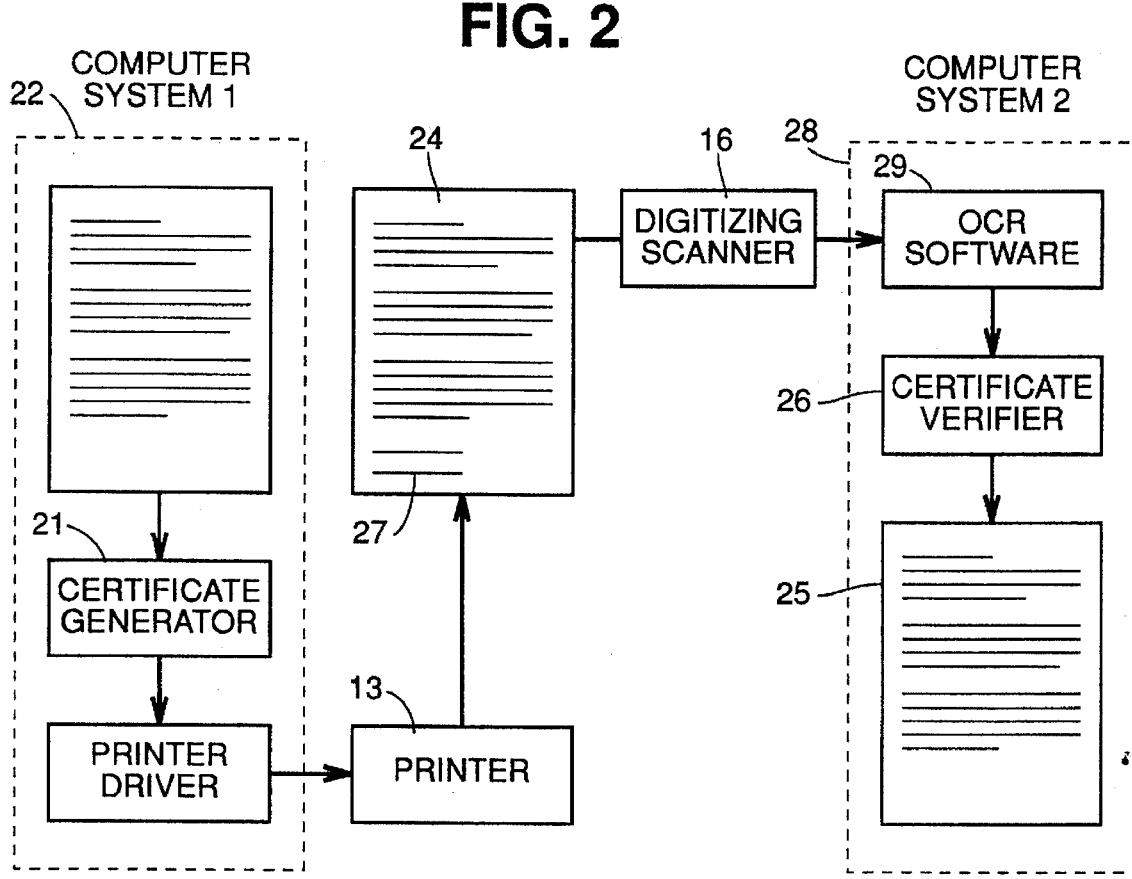
FIG. 2 schematically illustrates the OCR method for reproducing a document with markers having certificates to provide error detection.

When using the certificate component of a marker to assist in the computer generation of an original document, the certificate generator 21 of the originating computer, 22 as illustrated in FIG. 2, calculates one or many data-dependent certificates, 27, with an appropriate algorithm, an example of which is detailed below. A certificate is a succinct key encoding information about the contents of the page, produced upon generation of the document or at print time, and recognizable by the OCR software, 29, associated with the scanning computer, 28. Any document generated on a computer can have a marker including a certificate appended to or associated with each text block or page. The process of generating the marker requires no human intervention, and only a small added computational cost. As illustrated in FIG. 3, the document 34, as generated as a printed page or in another medium, is comprised of an area 35, formatted primarily for human use, and an area 37 formatted for machine use to assist the machine in its "understanding" of the so-called "human" area. The human area is the analog portion of the document and the machine area is the digital portion of the document. The distinction is used to designate the use made of the portions of the document rather than the specific embodiments. The two portions can, and preferably would be, printed using the same technology. As an example, the "digital" portion, i.e. the marker, can be printed using a special font, bar code or other symbology which may or may not be "readable" to the human user, but which is chosen to facilitate computer readability. The marker is intended to provide information to the OCR software so that it becomes possible to produce a perfectly transcribed digital copy of the original printed page.

The marker that is computed and printed on the page contains information about the contents of that page. The originating computer, 22 of FIG. 2, includes certifying software, 21, referred to as the certificate generator. Once the document has been created, or in the process of the creation thereof, the certifying software calculates one or more certificates based upon the information in and on the document. The marker, including at least the one generated certificate, 27, is produced as a machine readable part of the hardcopy, 24, of the document which is output by the printer, 13. As in the prior art, the hard copy to be reproduced is scanned using a digitizing scanner, 16, which is associated with a second computer, 28, equipped with the OCR software. The original marker, 27, is also optically scanned and saved by the scanning computer. After the OCR document has been created, the OCR software uses the same algorithm, as that used by the original printing software, to calculate a certificate for the extracted text. The illustration provides the "certificate verifier", 26, as a separate part of the computer 28 and the "certificate generator", 21, as part of computer 22. As would be evident to one having skill in the art, the certificate generator or certificate verifier is incorporated into the overall system and need not be a separate program. In addition, the calculating of certificates for original or scanned data is not necessarily a separate process step, but may be conducted concurrently with the creating and/or saving of the data. Once calculated, the new certificate is compared to the original certificate scanned from the printed page. If the new and the original certificates match, the translation is deemed complete and presumed to be error free with high probability. If there is a mismatch, the OCR certificate verifier software can detect and correct a small number of errors, given its own or one or more of the known error correction schemes used by current document creation or OCR systems, as discussed above.

As mentioned above, the marker may be, and preferably is, provided on the face of the printed document using a symbology other than the standard human-oriented character set such as ASCII. Given the problem at hand, the less than perfect ability of OCR to reproduce the human-oriented printed characters, a more highly machine-readable and reproducible technology such as barcode symbology is preferably employed when providing the marker on the surface of the document. Use of a more reliable symbology will not only promise more accurate interpretation of the symbol itself, but can also include internal error correction mechanisms for further insuring accurate reading of the marker. The scanning computer can be pre-programmed to locate the marker in a pre-determined location on the page, or can search each page it encounters for the document marker. It is not necessary that the marker be readable by, or even perceptible to, a human user of the printed document. The marker can, in fact, be provided in a symbology which is invisible on the face of the page, yet still perceptible to the scanner. Upon completion of the error correction, the certificate verifier then recalculates a certificate for the corrected text and again compares it to the original certificate to establish when the output is correct.

The check-sum can be computed in any of a number of ways. For example, the "C" subroutine shown below computes a simple check-sum on a line-by-line basis as follows:

```
#include <stdio.h>
#include <ctype.h>
#define MAXLEN 200                       /* maximum input line length */
Main() {
    char line [MAXLEN],
        hash;                            /* input line */
                                         /* 8-bit hash value */
    int len,                             /* length of input line */
        i;                               /* counter */
    while (gets (line) != NULL) {        /* while more lines */
        len = strlen(line);              /* get length of input line */
        if (len > 0)                     /* if line is non-empty */
            hash = 0;                    /* initialize 8-bit hash */
            for (i = 0; i < len; i++) {  /* check each character */
                if (!isspace (line[i])) {    /* if character is non-space */
```

```
            hash ^= line[i];                           /* XOR ASCII value with hash */
            hash = (hash<<1) | ((hash >> 7) & 0x01);   /* left-rotate hash */
        }
    }
}
    printf("%.2x", hash & 0xff);                       /* print hash value */
  }
}
```

The ASCII value of each non-space character is exclusive-or'd with a running 8-bit check-sum. This checksum is then bit-rotated one position to the left, and the process is repeated with the next character in sequence. In this case, the line "This is a test." would receive the check-sum "03" (expressed in hexadecimal notation), which would be printed on the page in question. If, in the process of scanning, the OCR software misread the line as "Thus is a test.", the calculated check-sum would be "73". Hence, the OCR software would detect the presence of an error by comparing the two check-sums (one newly computed on the reproduced text and one originally computed, printed and read from the printed certificate) and determining that they do not match. In using this sample system, the probability that two random lines of text would hash to the same check-sum is 1 in 256. The eight-bit check-sum is only one example of a certificate computation system. Those skilled in the art will readily recognize alternative computation methods which fall within the scope of the present invention. One having skill will additionally recognize that the size of the check-sum and the computation method can be varied to increase or decrease the probability of error detection as required by the specific application.

As discussed in the Background section, the error correction methods which are available for incorporation into an OCR system include dictionary lookup search strategies, semantic or context information codes and common error recognition codes, among others. Further to that end, the precise mathematical nature of the certificate generation algorithm lends itself to precise identification of the error and ready correction thereof without a need to invoke auxiliary error correction programs. Certificates can improve OCR recognition rates and provide a reliable method by which users can ascertain whether or not each scanned page is error free. As noted above, use of an error detection and correction system without knowing if intentional "errors" exist in a document can actually cause errors to be introduced into the text. When using a certificate system of error detection and correction, however, this can be avoided. In the instance of an intentional misspelling, for example, the certificate system would not indicate that an error had been made, and would not therefore erroneously correct the intentional misspelling.

One important consideration, particularly in the case of documents with complicated structures, is determining the canonical parsing order for computing the certificate. Obviously, the software that calculates the original certificate and the OCR software must both use the same order. One linearization formula may follow a left-to-right, top-to-bottom order in the same way that English text is normally read by humans. Another approach would be to decompose the page as a series of text blocks, each a separate entity in the calculation. Any blocks containing graphics or other non-text information must be handled differently than standard text. In the case of diagrams, recognition that a collection of "dots" corresponds to a perfect circle is a difficult task for image processing software. If, however, the certificate generator encodes the information that a given diagram contains 3 circles and a triangle, this information may greatly speed processing time and increase accuracy. Beyond encoding the existence of the diagram components, the precise locations and sizes of the basic geometric elements in the diagram could be encoded (e.g., circle radius 0.3 cm; x-coordinate 1.3 cm, y-coordinate 3.8 cm, etc.). It is further possible to adapt a certificate scheme to recognize mathematical equations or other special typeset structures.

Figure 4:
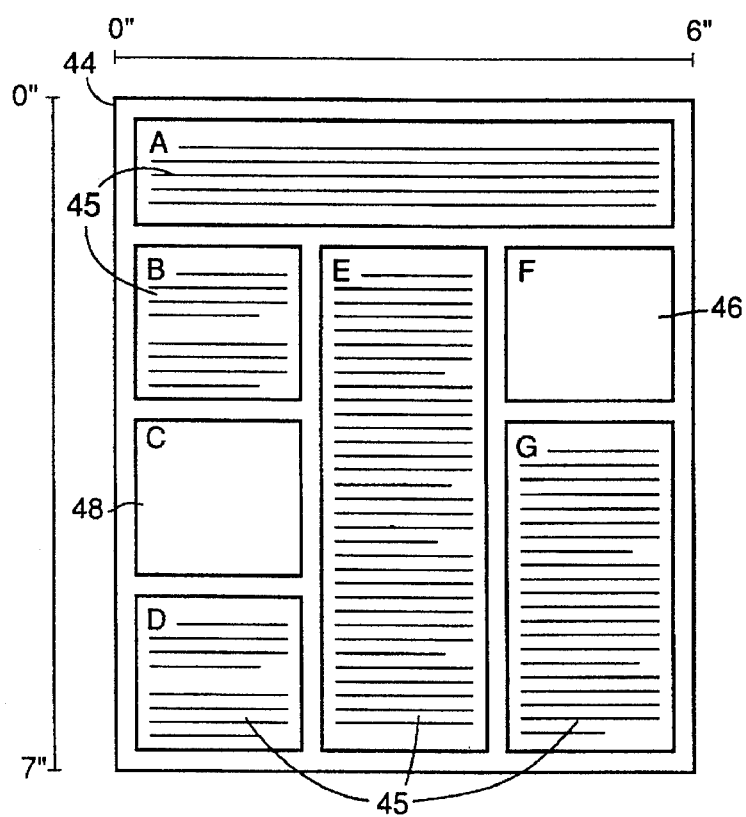
FIG. 4 illustrates a complex document containing diagrams, text blocks and photographs.
Figure 5:
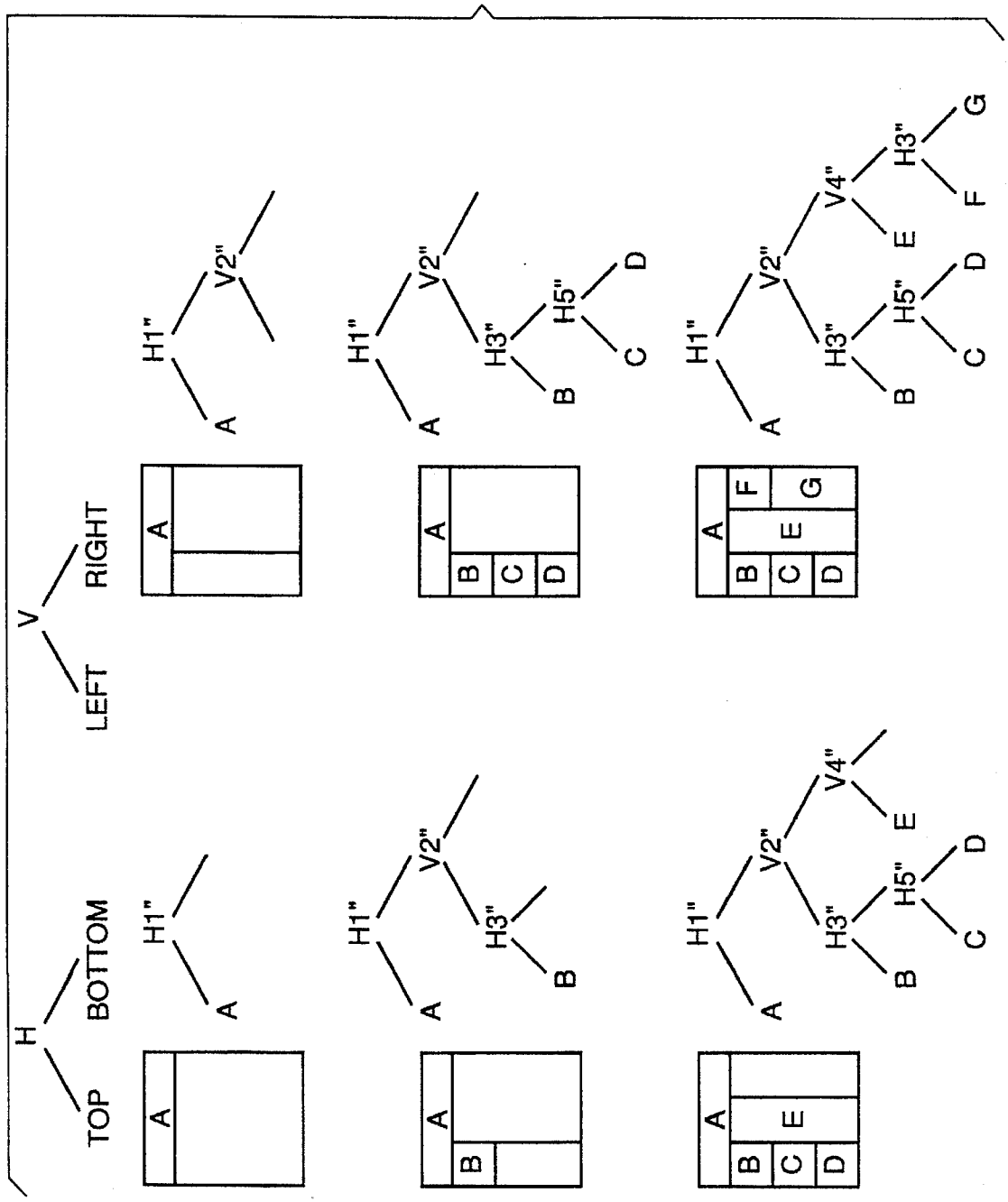
FIG. 5 illustrates one scheme for encoding the layout of the complex document illustrated in FIG. 4.

It is also desirable to incorporate the document structure information in a document marker. A 6" by 7" document having a complicated layout structure is illustrated in FIG. 4. The document, 44, contains text blocks A, B, D, E and G at 45, a photograph in block C at 48, and a diagram in block F at 46. In order to identify the document layout to the scanning system, one layout identification system which can be utilized is based upon a plane-slicing model, as is illustrated in FIG. 5. Other models can be utilized as appropriate. The plane-slicing model example presumes that the layout of a document, no matter how complicated, can be described by some number of cuts. The plane slicing can be represented recursively as a binary tree, provided the canonical ordering for the subplanes, represented by the leaves, has been defined. The slices or planes are first identified, and characterized as specific horizontal and vertical components, H and V, for example. Each slice is identified as a part of a tree structure. This tree structure is then encoded as a linear string. A recursive syntax is used to yield, for the illustrated document, the following: $(H1"CRT_A(V2"(H3"CRT_B (H5"PHT_C CRT_D))(V4"CRT_E(H3"FIG_F CRT_G)))$; wherein each precise location is defined in inches, vertically or horizontally oriented; CRT represents the certificate calculated for the designated text block; PHT represents the photograph; and, FIG designates the diagram. This short string then completely describes the basic layout of the document. Within the string can be embedded additional information such as a description of the subplane contents (e.g., text, figure, equation, photo), precise x,y coordinates of the subplane on the page, and of course the error detection certificates.

To remain unobtrusive to the human reader, it is possible to "hide" the markers in, for example, a logo. A ¾×¾ inch logo can encode over 1,000 bits of information. Other embodiments may include using invisible inks or hiding the markers in the format of the document itself. It is not necessary that the information be provided apart from the human readable portion of the document, for example in a blank margin. What is necessary is that the information be provided in such a manner that the computer can readily ascertain its location and easily read the encoded information; and that it not interfere with the human readable portion in such a manner as to render it unreadable.

Since the markers are being described in terms of OCR use, it has been assumed thus far that the medium for reading the marker is a digitizing scanner. With the development of other input media, the encoding schemes will require adaptation to accommodate the relevant system. As with all of the preceding discussion, such modifications as would occur to one having skill in the art may be made without departing from the spirit and scope of the appended claims wherein:

What is claimed is:

1. A method for ensuring the accuracy of lines of reproduced data electronically reproduced from lines of original data comprising:

first deriving one or more data-dependent first values from said original data;

second deriving one or more data-dependent second values from said reproduced data;

comparing said first and second values and identifying errors and error locations within said lines of reproduced data based on the difference between said first and second values; and effecting one or more methods of automatic correction of said identified errors on said reproduced data.

2. The method of claim 1 wherein said deriving comprises calculating said data-dependent values.

3. The method of claim 1 wherein said automatic correction produces error-corrected reproduced data and further comprising the steps of:

deriving one or more data-dependent third values to said error-corrected reproduced data; and comparing said first and third values.

4. A method for electronically reproducing lines of original data of computer-preprocessed printed documents comprising the steps of:

deriving one or more first data-dependent values from said original data;

printing said document including said one or more first values;

creating an electronic document having lines of reproduced data by optically scanning said printed document and said first values and saving said electronic document and first values;

deriving one or more second data-dependent values from said reproduced data of said electronic document;

comparing said first and second values and identifying errors and error locations within said lines of reproduced data based on the difference between said first and second values; and automatically correcting said identified errors by applying one or more error correction methods to said reproduced data.

5. The method of claim 4 wherein said deriving of first and second values comprises applying the same algorithm to the data of each of said computer-generated and electronic documents.

6. The method of claim 4 wherein said creating and said deriving of said second values are conducted simultaneously.

7. The method of claim 4 wherein said automatic correcting of said identified errors produces a second electronic document and further comprising the steps of:

deriving one or more third data-dependent values to said second electronic document; and comparing said first and third data-dependent values.

8. The method of claim 4 wherein said printing of said one or more first values comprises providing said one or more first values in a non-textual machine-readable symbology.

9. A method for providing an electronic reproduction having lines of reproduced data from a printed document having lines of original data using optical character recognition comprising the steps of:

creating a first computer version of said document in a first computer;

deriving at least one first digital value for said first version of said document from said original data;

creating a printed version of said document by outputting said first version and said at least one first digital value to a printer associated with said first computer;

creating a second computer version of said document comprising reproduced data by optically scanning said printed version and said at least one first digital value with a scanner associated with a second computer having software for recognizing said optical characters and said digital value;

deriving at least one second digital value for said second computer version of said document from said reproduced data;

comparing said at least one first digital value to said at least one second digital value and identifying errors and error locations within said lines of reproduced data based on the difference between said at least one first and second digital values; and effecting automatic error correction of said second computer version by applying one or more error correction methods to said reproduced data.

10. The method of claim 9 wherein said printed document comprises a plurality of blocks comprising at least multiple text blocks of multiple lines of original data and wherein said deriving of said at least one first digital value includes providing at least one first digital characterization of the spatial relationship of said plurality of blocks in said document.

11. The method of claim 9 wherein said deriving of said at least one first and second digital values comprises calculating said values on the data in each of said first and second computer versions of said documents, respectively.

12. The method of claim 9 further comprising the steps of deriving at least one third digital value to said second computer version of said document after said error correction and comparing said at least one first digital value to said at least one third digital value.

13. The method of claim 9 whereby said effecting automatic error correction produces a third computer version and further comprising the steps of:

deriving at least one third digital value to said third computer version; and comparing said first and third digital values.

14. The method of claim 9 wherein said at least one first digital value is printed on said document in non-textual machine-readable symbology.

15. A method for electronically reproducing a computer-preprocessed printed document having a layout comprising a plurality of original blocks comprising at least multiple text blocks of multiple lines of characters comprising the steps of:

deriving at least one first layout-dependent value from the spatial relationship of said plurality of original blocks on said document;

printing said multiple text blocks of multiple lines and said at least one first layout-dependent value;

creating an electronic document with layout comprising a plurality of reproduced blocks comprising at least multiple text blocks of multiple lines of reproduced characters by optically scanning said multiple lines and said at least one first layout-dependent value;

deriving at least one second layout-dependent value from the spatial relationship of said plurality of reproduced blocks on said electronic document;

comparing said at least one first layout-dependent value to said at least one second layout-dependent value; and detecting and locating layout errors based upon the difference between said at least one first and second layout-dependent values.

16. The method of claim 15 further comprising the steps of:

deriving at least one first character-dependent value from said characters or said document; and printing said at least one first character-dependent value upon printing of said multiple lines and said at least one first layout dependent value.

17. The method of claim 16 further comprising the steps of:

deriving at least one second character-dependent value from said reproduced characters of said electronic document;

comparing said at least one first character-dependent value to said at least one second character-dependent value and identifying character errors and error locations in said lines based upon the differences between said first and second character-dependent values; and effecting one or more methods of automatic correction of said identified character errors on said reproduced characters.

18. A method for insuring the accuracy of a second document comprising reproduced data sequences reproduced by optically scanning a first document, comprising original data sequences and at least one encoded, machine-readable, first data-dependent value assigned to and scannable on the face of said first document, comprising the steps of:

decoding said at least one encoded, machine-readable, first data-dependent value;

deriving at least one second data-dependent value for said second document from said reproduced data sequences;

comparing said at least one first data-dependent value to said at least one second data-dependent value and identifying errors and error locations within said reproduced data sequences based upon the differences between said first and said second data-dependent values; and effecting automatic error correction on said reproduced data sequences when said first and said second data-dependent values are different.

* * * * *